US012106699B2

(12) United States Patent
Chang

(10) Patent No.: US 12,106,699 B2
(45) Date of Patent: Oct. 1, 2024

(54) DISPLAY SYSTEM SUPPORTING PRIVACY FUNCTION AND DISPLAY CONTROL METHOD

(71) Applicant: Acer Incorporated, New Taipei (TW)

(72) Inventor: Fang-Wei Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/975,581

(22) Filed: Oct. 27, 2022

(65) Prior Publication Data

US 2024/0021139 A1 Jan. 18, 2024

(30) Foreign Application Priority Data

Jul. 14, 2022 (TW) ................................. 111126394

(51) Int. Cl.
*G09G 3/22* (2006.01)

(52) U.S. Cl.
CPC ....... *G09G 3/22* (2013.01); *G09G 2320/0626* (2013.01)

(58) Field of Classification Search
CPC ............ G09G 3/22; G09G 2320/0626; G09G 2320/062; G09G 2320/068; G09G 2320/028; G09G 2330/021; G09G 3/3406; G09G 2320/0686; G06F 21/84; G06F 21/6245; G06F 3/1423; G06F 1/3265
See application file for complete search history.

(56) References Cited

U.S. PATENT DOCUMENTS

| | | | | |
|---|---|---|---|---|
| 6,373,397 | B1 * | 4/2002 | Song | H04M 1/0245 455/566 |
| 2016/0179231 | A1 * | 6/2016 | Kwak | G06F 3/0412 345/173 |
| 2016/0232832 | A1 * | 8/2016 | Kang | G09G 3/2014 |
| 2017/0263208 | A1 * | 9/2017 | Imai | G09G 5/373 |
| 2021/0240021 | A1 * | 8/2021 | Hsieh | G02F 1/1334 |
| 2022/0108662 | A1 * | 4/2022 | Hsieh | G09G 3/3413 |

FOREIGN PATENT DOCUMENTS

| | | |
|---|---|---|
| CN | 114639334 | 6/2022 |
| TW | 201339987 | 10/2013 |
| TW | I485490 | 5/2015 |
| TW | 201805705 | 2/2018 |
| TW | I704550 | 9/2020 |

* cited by examiner

*Primary Examiner* — Matthew A Eason
*Assistant Examiner* — Sujit Shah
(74) *Attorney, Agent, or Firm* — JCIPRNET

(57) ABSTRACT

A display system supporting a privacy function and a display control method are disclosed. The method includes the following. A first light source driving signal is provided to a display through a first signal path of a switch circuit to drive the display to display a first image in a first display mode. A trigger signal is generated in response to a user operation. A second light source driving signal is provided to the display through a second signal path of the switch circuit in response to the trigger signal to drive the display to display a second image in a second display mode. The first signal path is different from the second signal path. A screen brightness of the display in the second display mode is lower than a screen brightness of the display in the first display mode.

14 Claims, 5 Drawing Sheets

DISPLAY SYSTEM SUPPORTING PRIVACY FUNCTION AND DISPLAY CONTROL METHOD

CROSS-REFERENCE TO RELATED APPLICATION

This application claims the priority benefit of Taiwanese application no. 111126394, filed on Jul. 14, 2022. The entirety of the above-mentioned patent application is hereby incorporated by reference herein and made a part of this specification.

BACKGROUND

Technical Field

The disclosure relates to a display control technology. In particular, the disclosure relates to a display system supporting a privacy function and a display control method.

Description of Related Art

When operating a notebook computer or a desktop computer, a user typically externally attach a privacy protection film to a computer screen to protect an image on the computer screen from being peeped by others. However, a brightness of the computer screen may drop after the privacy film is externally attached. Therefore, when no one is around, the user typically needs to manually remove the privacy protection film on the screen to improve the screen display quality, causing inconvenience in use.

SUMMARY

The disclosure provides a display system supporting a privacy function and a display control method.

An embodiment of the disclosure provides a display system supporting a privacy function, including a display, a switch circuit, a first control circuit, a second control circuit, and a button module. The switch circuit is coupled to the display. The first control circuit is coupled to the switch circuit. The second control circuit is coupled to the switch circuit and the display. The button module is coupled to the second control circuit. The first control circuit is configured to provide a first light source driving signal to the display through a first signal path of the switch circuit to drive the display to display a first image in a first display mode. The button module is configured to generate a trigger signal in response to a user operation. The second control circuit is configured to provide a second light source driving signal to the display through a second signal path of the switch circuit in response to the trigger signal to drive the display to display a second image in a second display mode. The first signal path is different from the second signal path. A screen brightness of the display in the second display mode is lower than a screen brightness of the display in the first display mode.

An embodiment of the disclosure additionally provides a display control method, including the following. A first light source driving signal is provided to a display through a first signal path of a switch circuit to drive the display to display a first image in a first display mode. A trigger signal is generated in response to a user operation. A second light source driving signal is provided to the display through a second signal path of the switch circuit in response to the trigger signal to drive the display to display a second image in a second display mode. The first signal path is different from the second signal path. A screen brightness of the display in the second display mode is lower than a screen brightness of the display in the first display mode.

Based on the foregoing, in the display system supporting a privacy function and the display control method according to the embodiments of the disclosure, different light source driving signals may be provided to the display through different signal paths in the switch circuit according to the trigger signal generated by the user operation to adjust the screen brightness of the display in different display modes. Compared to the conventional display whose screen brightness is uniformly controlled by a single signal path, in the disclosure, the light source driving signals are transmitted to the display through different signal paths, effectively helping the display with the screen privacy function.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
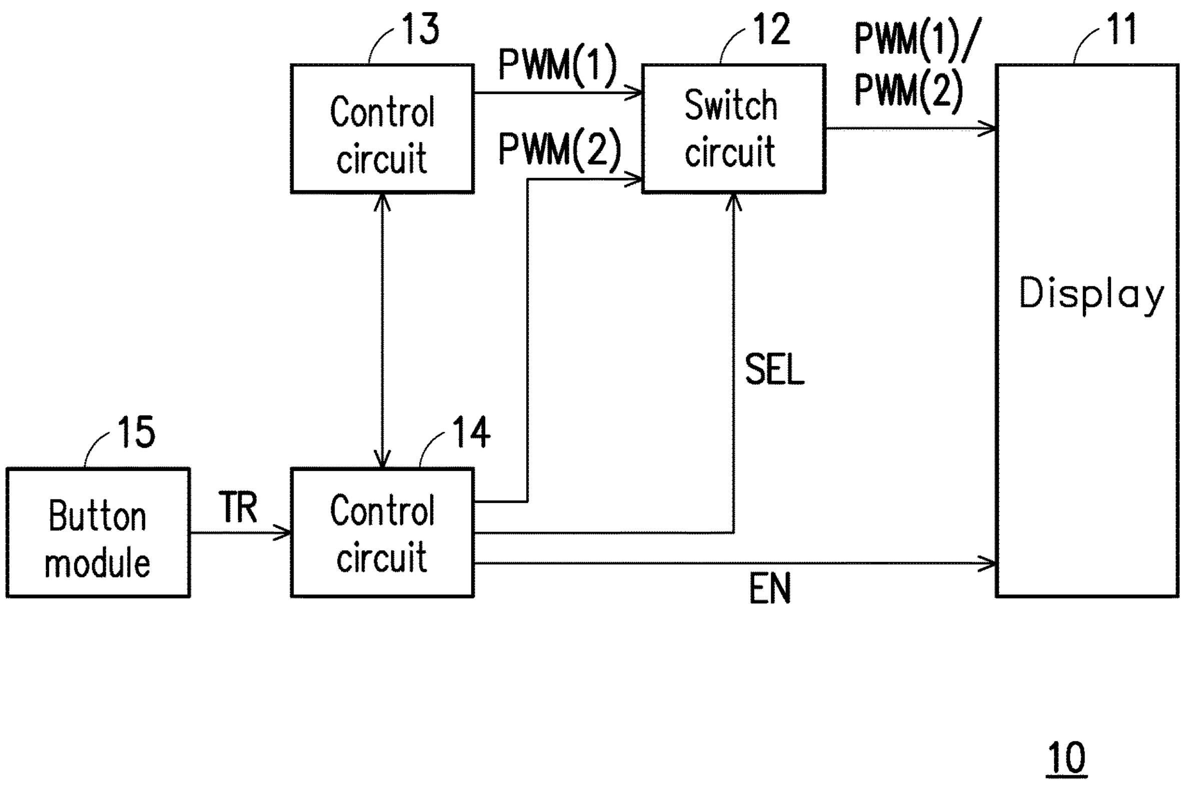
FIG. 1 is a schematic diagram of a display system supporting a privacy function according to an embodiment of the disclosure.

FIG. 1 is a schematic diagram of a display system supporting a privacy function according to an embodiment of the disclosure.

With reference to FIG. 1, a display system 10 may be implemented in a notebook computer and a desktop computer among various computer systems with a display. The display system 10 includes a display 11, a switch circuit 12, a control circuit (also referred to as a first control circuit) 13, a control circuit (also referred to as a second control circuit) 14, and a button module 15.

The display 11 is configured to display an image. For example, the display 11 may include a plasma display, a liquid-crystal display (LCD), a thin-film transistor liquid crystal display (TFT-LCD), an organic light-emitting diode (OLED), a LED display, etc., and the form of the display 11 is not limited thereto. In particular, the display 11 may support a screen privacy function. The screen privacy function effectively prevents the image displayed by the display 11 from being peeped by outsiders. The technical details of the screen privacy function will be described later.

The switch circuit 12 is coupled to the display 11, the control circuit 13, and the control circuit 14. The control circuit 13 may be configured to generate a light source driving signal (also referred to as a first light source driving signal) PWM(1). For example, the control circuit 13 may include a light source driving circuit (also referred to as a first light source driving circuit) (not shown). The first light source driving circuit may be configured to generate the light source driving signal PWM(1) according to a reference signal (not shown). The control circuit 14 may be configured to generate a light source driving signal (also referred to as a second light source driving signal) PWM(2). For example, the control circuit 14 may also include a light source driving circuit (also referred to as a second light source driving circuit) (not shown). The second light source driving circuit may be configured to generate the light source driving signal PWM(2) according to a reference signal (not shown). One of the light source driving signal PWM(1) and the light source driving signal PWM(2) may be sent to the display 11 through the switch circuit 12 to drive the display 11 to display an image. For example, the light source driving signal PWM(1) and the light source driving signal PWM(2) are each a pulse width modulation (PWM) signal. The light source driving signal PWM(1) and the light source driving signal PWM(2) may each be used to control a screen brightness of the display 11. It should be noted that the generation of the light source driving signal is well known to those skilled in the art, and is therefore not repeatedly described here.

In an embodiment, the control circuit 13 may be coupled to an input terminal (also referred to as a first input terminal) of the switch circuit 12. The control circuit 13 may send the light source driving signal PWM(1) to the first input terminal of the switch circuit 12. The control circuit 14 may be coupled to another input terminal (also referred to as a second input terminal) of the switch circuit 12. The control circuit 14 may send the light source driving signal PWM(2) to the second input terminal of the switch circuit 12. The display 11 may be coupled to an output terminal of the switch circuit 12. The switch circuit 12 may provide one of the light source driving signal PWM(1) generated by the control circuit 13 and the light source driving signal PWM (2) generated by the control circuit 14 to the display 11 through different signal paths to drive the display 11 to display an image by one of the light source driving signal PWM(1) and the light source driving signal PWM(2).

The display 11 may control or adjust a backlight brightness of a display panel (not shown) of the display 11 according to one of the received light source driving signal PWM(1) and the received light source driving signal PWM (2). For example, the backlight brightness may be positively correlated to the screen brightness of the display 11. In other words, the screen brightness of the display 11 increases as the backlight brightness increases.

The button module 15 is coupled to the control circuit 14. The button module 15 may detect a user operation and generate a trigger signal TR in response to the user operation. For example, the button module 15 may include a contact-type or non-contact-type physical button. The contact-type physical button may be configured to detect a contact-type physical operation, such as touching or pressing by a user, and generate the trigger signal TR in response to the physical operation. The non-contact-type physical button may be configured to detect a non-contact-type physical operation such as approaching of a finger of the user and generate the trigger signal TR in response to the physical operation. The trigger signal TR may be sent to the control circuit 14.

The control circuit 14 may switch or change a display mode of the display 11 in response to the trigger signal TR. For example, the control circuit 14 may control the display mode of the display 11 to switch between a predetermined display mode (also referred to as a first display mode) and a screen privacy mode (also referred to as a second display mode) in response to the trigger signal TR.

It should be noted that the screen privacy function of the display 11 is not activated in the first display mode (i.e., the predetermined display mode). In other words, the screen privacy function of the display 11 may be in a deactivated state in the first display mode. In addition, the screen privacy function of the display 11 may be activated in the second display mode (i.e., the screen privacy mode). In other words, the screen privacy function of the display 11 may be in an activated state in the second display mode. In other words, the control circuit 14 may activate or deactivate the screen privacy function of the display 11 in response to the trigger signal TR.

The control circuit 13 may provide the light source driving signal PWM(1) to the display 11 through a signal path (also referred to as a first signal path) of the switch circuit 12. The light source driving signal PWM(1) may be used to drive the display 11 to display an image (also referred to as a first image) in the first display mode. Accordingly, the control circuit 13 may control or adjust the screen brightness of the display 11 according to the light source driving signal PWM(1) in the first display mode. In other words, the permissions to control the screen brightness (or the backlight brightness) of the display 11 is assigned to the control circuit 13 in the first display mode (i.e., the predetermined display mode).

When the user performs a user operation (e.g., pressing the physical button in the button module 15) to trigger the button module 15, the button module 15 may generate the trigger signal TR in response to the user operation. In an embodiment, the trigger signal TR may be used to switch or change the display mode of the display 11. In an embodiment, the trigger signal TR may be used to activate or deactivate the screen privacy function of the display 11.

In an embodiment, the trigger signal TR may also be used to switch or change the permissions to control the screen brightness (or the backlight brightness) of the display 11 by the control circuit 13 and the control circuit 14. For example, the control circuit 14 may switch or change the permissions to control the screen brightness (or the backlight brightness) of the display 11 by the control circuit 13 and the control circuit 14 in response to the trigger signal TR.

When the control circuit 13 provides the light source driving signal PWM(1) to the display 11 through the first signal path of the switch circuit 12, the control circuit 14 may provide the light source driving signal PWM(2) to the display 11 through another signal path (also referred to as a second signal path) of the switch circuit 12 in response to the trigger signal TR. The light source driving signal PWM(2) may be used to drive the display 11 to display an image (also referred to as a second image) in the second display mode. The first signal path is different from the second signal path. Accordingly, the control circuit 14 may control or adjust the screen brightness of the display 11 according to the light source driving signal PWM(2) in the second display mode. In other words, the permissions to control the screen brightness (or the backlight brightness) of the display 11 is assigned to the control circuit 14 in the second display mode (i.e., the screen privacy mode). In particular, a screen brightness (or a backlight brightness) of the display 11 in the second display mode may be lower than a screen brightness (or a backlight brightness) of the display 11 in the first display mode.

In addition, when the control circuit 14 provides the light source driving signal PWM(2) to the display 11 through the second signal path of the switch circuit 12, the permissions to control the screen brightness (or the backlight brightness) of the display 11 may be reassigned to the control circuit 13 in response to the trigger signal TR. Therefore, the control circuit 13 may provide the light source driving signal PWM(1) to the display 11 through the first signal path of the switch circuit 12 again in response to the trigger signal TR to drive the display 11 to display the first image in the first display mode.

In an embodiment, the display 11 may determine the screen brightness (or the backlight brightness) of the display 11 to be a predetermined brightness according to the instruction (i.e., the light source driving signal PWM(1)) of the control circuit 13 in the first display mode (i.e., the predetermined display mode). Nonetheless, the display 11 may set the screen brightness (or the backlight brightness) of the display 11 to be lower than the predetermined brightness according to the instruction (i.e., the light source driving signal PWM(2)) of the control circuit 14 in the second display mode (i.e., the screen privacy mode).

In an embodiment, the screen brightness (or the backlight brightness) of the display 11 may be reduced, for example, below the predetermined brightness in response to the screen privacy function being activated (i.e., the display 11 operating in the second display mode). In addition, the screen brightness (or the backlight brightness) of the display 11 may be increased or restored, for example, to the predetermined brightness in response to the screen privacy function being deactivated (i.e., the display 11 operating in the first display mode).

In an embodiment, the control circuit 14 may also generate a path selection signal SEL in response to the trigger signal TR. The path selection signal SEL may be sent to the switch circuit 12. For example, the path selection signal SEL may be sent to a control terminal of the switch circuit 12. The switch circuit 12 may switch a signal transmission path inside the switch circuit 12 according to the path selection signal SEL. For example, the switch circuit 12 may switch the signal transmission path inside the switch circuit 12 from one of the first signal path and the second signal path to the other of the first signal path and the second signal path according to the path selection signal SEL.

In an embodiment, the control circuit 14 may also generate an enabling signal EN in response to the trigger signal TR. The enabling signal EN may be sent to the display 11. The display 11 may switch or change the display mode (comparable to activating or deactivating the screen privacy function) of the display 11 in response to the enabling signal EN. For example, the display 11 may switch the display mode from the first display mode to the second display mode or switch the display mode from the second display mode to the first display mode according to the enabling signal EN.

In an embodiment, the display 11 may also adjust a viewing angle of a display screen of the display 11 in response to the enabling signal EN. For example, the display 11 may automatically reduce the viewing angle of the display screen, for example, to be less than a predetermined angle in response to the screen privacy function being activated (i.e., the display 11 operating in the second display mode). In addition, the display 11 may automatically increase or restore the viewing angle of the display screen of the display 11, for example, to the predetermined angle in response to the screen privacy function being deactivated (i.e., the display 11 operating in the first display mode).

Figure 2:
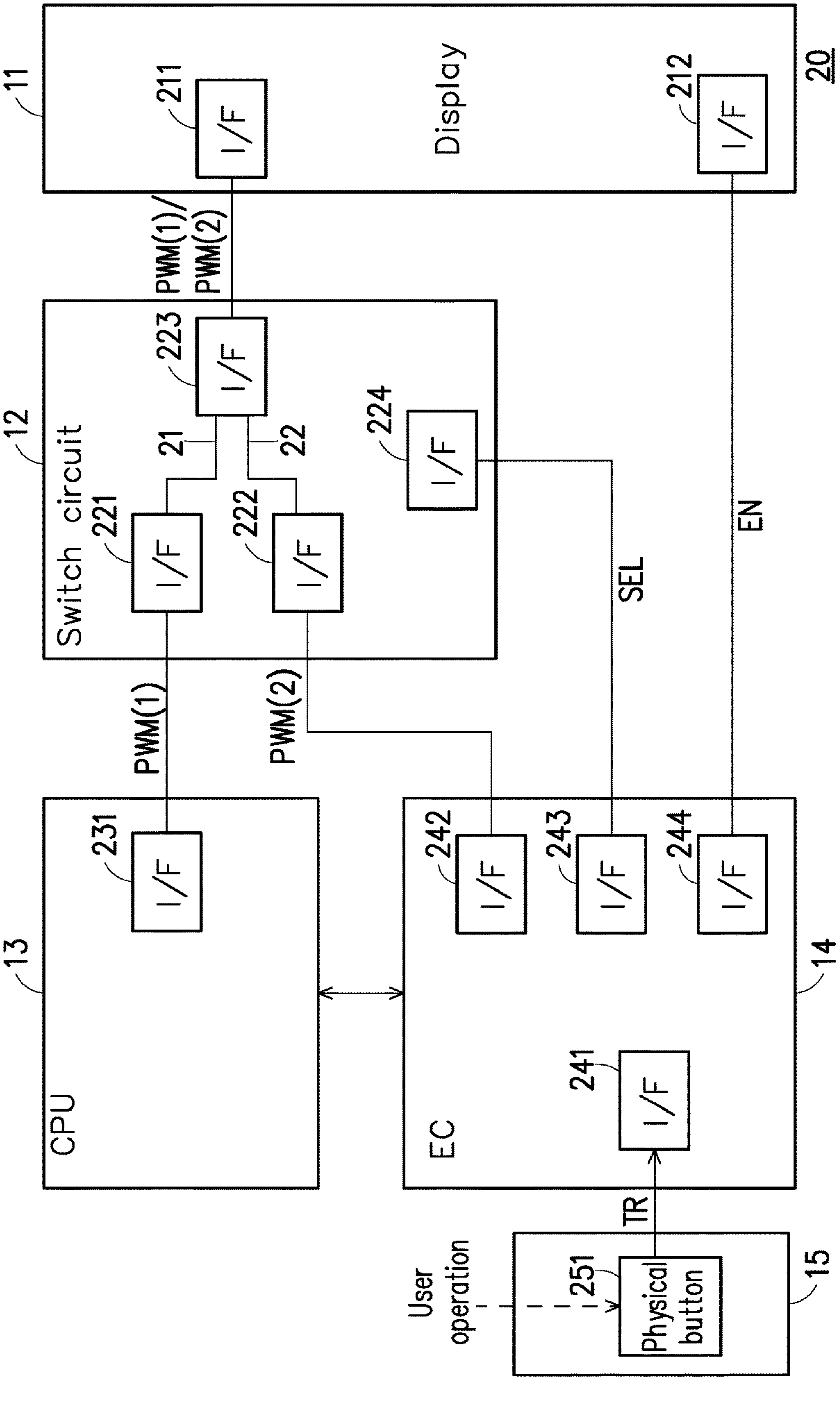
FIG. 2 is a schematic diagram of a display system supporting a privacy function according to an embodiment of the disclosure.

FIG. 2 is a schematic diagram of a display system supporting a privacy function according to an embodiment of the disclosure.

With reference to FIG. 2, a display system 20 may include the display 11, the switch circuit 12, the control circuit 13, the control circuit 14, and the button module 15 of FIG. 1. In particular, in the embodiment of FIG. 2, a central processing unit (CPU) and an embedded controller (EC) are respectively taken as examples for the control circuit 13 and the control circuit 14. Nonetheless, the form of the control circuit 13 and the form of the control circuit 14 are not limited thereto.

[First Display Mode (i.e., the Predetermined Display Mode)]

In the first display mode, the control circuit 13 may send the light source driving signal PWM(1) through an interface (I/F) 231 to an interface 221 of the switch circuit 12 (i.e., the first input terminal of the switch circuit 12). Meanwhile, the control circuit 14 may send the path selection signal SEL through an interface 243 to an interface 224 of the switch circuit 12 (i.e., the control terminal of the switch circuit 12). For example, the interface 243 and the interface 224 may be compliant with specifications of general-purpose input/output (GPIO), and the form of the interface 243 and the form of the interface 224 are not limited thereto. According to the path selection signal SEL, the switch circuit 12 may turn on a signal path 21 (i.e., a first signal path) located between the interface 221 and an interface 223 (i.e., the output terminal of the switch circuit 12) in the switch circuit 12 to serve as the current signal transmission path and turn off a signal path 22 (i.e., a second signal path) between an interface 222 (i.e., the second input terminal of the switch circuit 12) and the interface 223 in the switch circuit 12. Therefore, the light source driving signal PWM(1) may be sent to the display 11 through the turned-on signal path 21. The display 11 may receive the light source driving signal PWM(1) through an interface 211, and control or adjust the screen brightness (or the backlight brightness) of the display 11 according to the light source driving signal PWM(1).

[Switching Display Mode (Switching from the First Display Mode to the Second Display Mode)]

In an embodiment, the button module 15 includes a physical button 251. For example, the physical button 251 may be a shortcut key on a physical keyboard. When receiving or detecting a user operation (e.g., the user pressing the shortcut key) that may trigger the physical button 251, the button module 15 may generate the trigger signal TR. The control circuit 14 may receive the trigger signal TR through an interface 241. For example, the interface 241 may be a serial communication interface (SCI) or a serial peripheral interface (SPI), and the form of the interface 241 is not limited thereto.

In the first display mode, the control circuit 14 may send the enabling signal EN through an interface 244 to the display 11 in response to the trigger signal TR. The display 11 may receive the enabling signal EN through an interface 212. For example, the interface 244 and the interface 212 may also be compliant with specifications of general-purpose input/output (GPIO), and the form of the interface 244 and the form of the interface 212 are not limited thereto. The display 11 may switch the display mode of the display 11 from the first display mode to the second display mode (i.e., the screen privacy mode) and activate a screen privacy function in response to the enabling signal EN.

[Second Display Mode (i.e., the Screen Privacy Mode)]

In the second display mode, the control circuit 14 may send the light source driving signal PWM(2) through an interface 242 to the interface 222 of the switch circuit 12. Meanwhile, the control circuit 14 may adjust the path selection signal SEL and send the adjusted path selection signal SEL through the interface 243 to the interface 224 of the switch circuit 12. The switch circuit 12 may turn off the signal path 21 and turn on the signal path 22 to serve as the current signal transmission path according to the adjusted path selection signal SEL. Therefore, the light source driving signal PWM(2) may be sent to the display 11 through the turned-on signal path 22. The display 11 may receive the light source driving signal PWM(2) through the interface 211 and control or adjust the screen brightness (or the backlight brightness) of the display 11 according to the light source driving signal PWM(2). In particular, after switching from the first display mode to the second display mode, the display 11 may reduce the screen brightness (or the backlight brightness) of the display 11 according to the light source driving signal PWM(2). In addition, the display 11 may also adjust (e.g., reduce) the viewing angle of the display screen of the display 11 in response to the screen privacy function being activated.

[Switching Display Mode (Switching from the Second Display Mode Back to the First Display Mode)]

In the second display mode, it is assumed that the button module 15 generates the trigger signal TR again in response to the user operation. The control circuit 14 may send the enabling signal EN through the interface 244 to the display 11 again in response to the trigger signal TR. The display 11 may switch the display mode of the display 11 from the second display mode back to the first display mode and deactivate the screen privacy function in response to the enabling signal EN. In addition, the display 11 may also adjust (e.g., increase or restore) the viewing angle of the display screen of the display 11 in response to the screen privacy function being deactivated.

In an embodiment, the path selection signal SEL may be logic low and logic high respectively in the first display mode and the second display mode. Alternatively, in an embodiment, the path selection signal SEL may also be logic high and logic low respectively in the first display mode and the second display mode. In addition, in other embodiments, the path selection signal SEL may also be adjusted depending on the practical requirements, which is not limited by the disclosure.

Figure 3:
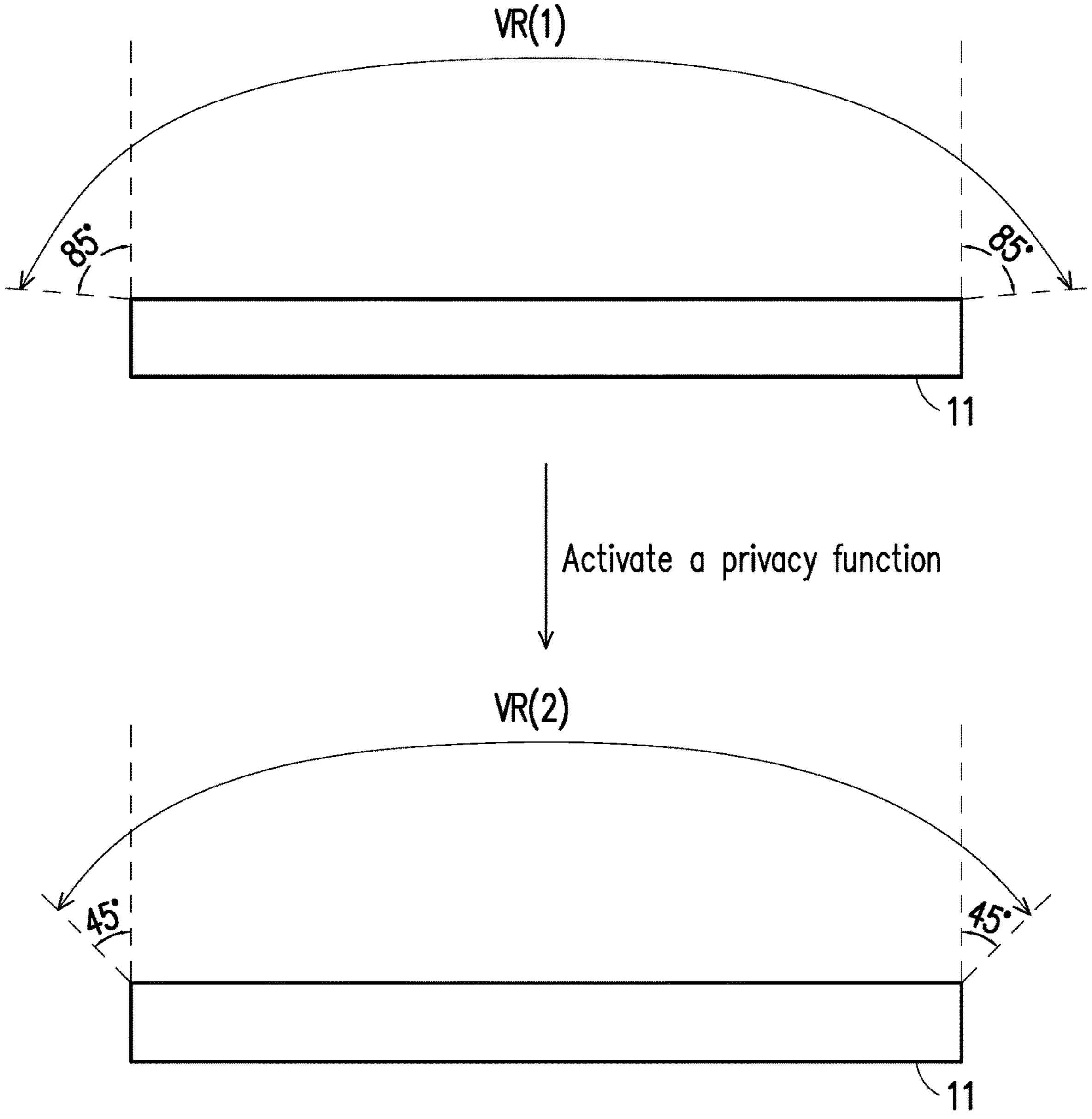
FIG. 3 is a schematic diagram of adjusting a viewing angle of a display screen of a display in response to a screen privacy function being activated according to an embodiment of the disclosure.

FIG. 3 is a schematic diagram of adjusting a viewing angle of a display screen of a display in response to a screen privacy function being activated according to an embodiment of the disclosure.

With reference to FIG. 3, a screen privacy function has not been activated in a first display mode. Therefore, the viewing angle of the display screen of the display 11 in the first display mode may be represented by a viewing range VR(1). For example, the viewing range VR(1) may cover a range directly in front of the display screen of the display 11 extending toward the left and right sides for a maximum of about 85 degrees or even approximate to 90 degrees. It should be noted that the disclosure does not limit the specific dimensions of the range of the viewing range VR(1).

The screen privacy function is activated in a second display mode. Therefore, the viewing angle of the display screen of the display 11 may be reduced in the second display mode. For example, the viewing angle of the display screen of the display 11 in the second display mode may be represented by a viewing range VR(2). For example, the viewing range VR(2) may cover a range directly in front of the display screen of the display 11 extending toward the left and right sides for a maximum of about 45 degrees. Accordingly, after the screen privacy function is activated, it can effectively prevent the image displayed by the display 11 from being peeped by outsiders. It should be noted that the disclosure does not limit the specific dimensions of the range of the viewing range VR(2). In addition, the viewing angle of the display screen of the display 11 may be adjusted by dynamically adjusting the orientation of the light-emitting elements on the display panel of the display 11 or the like, which is not limited by the disclosure.

Figure 4:
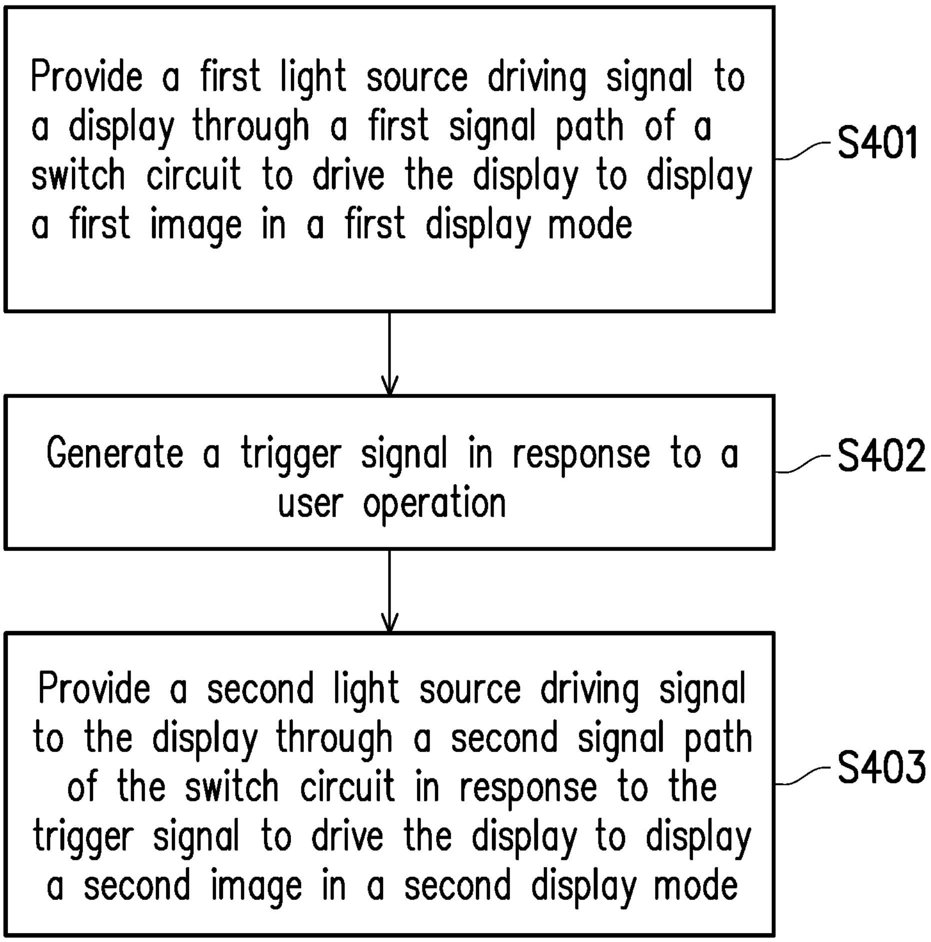
FIG. 4 is a flowchart of a display control method according to an embodiment of the disclosure.

FIG. 4 is a flowchart of a display control method according to an embodiment of the disclosure.

With reference to FIG. 4, in step S401, a first light source driving signal is provided to a display through a first signal path of a switch circuit to drive the display to display a first image in a first display mode. In step S402, a trigger signal is generated in response to a user operation. In step S403, a second light source driving signal is provided to the display through a second signal path of the switch circuit in response to the trigger signal to drive the display to display a second image in a second display mode.

Figure 5:
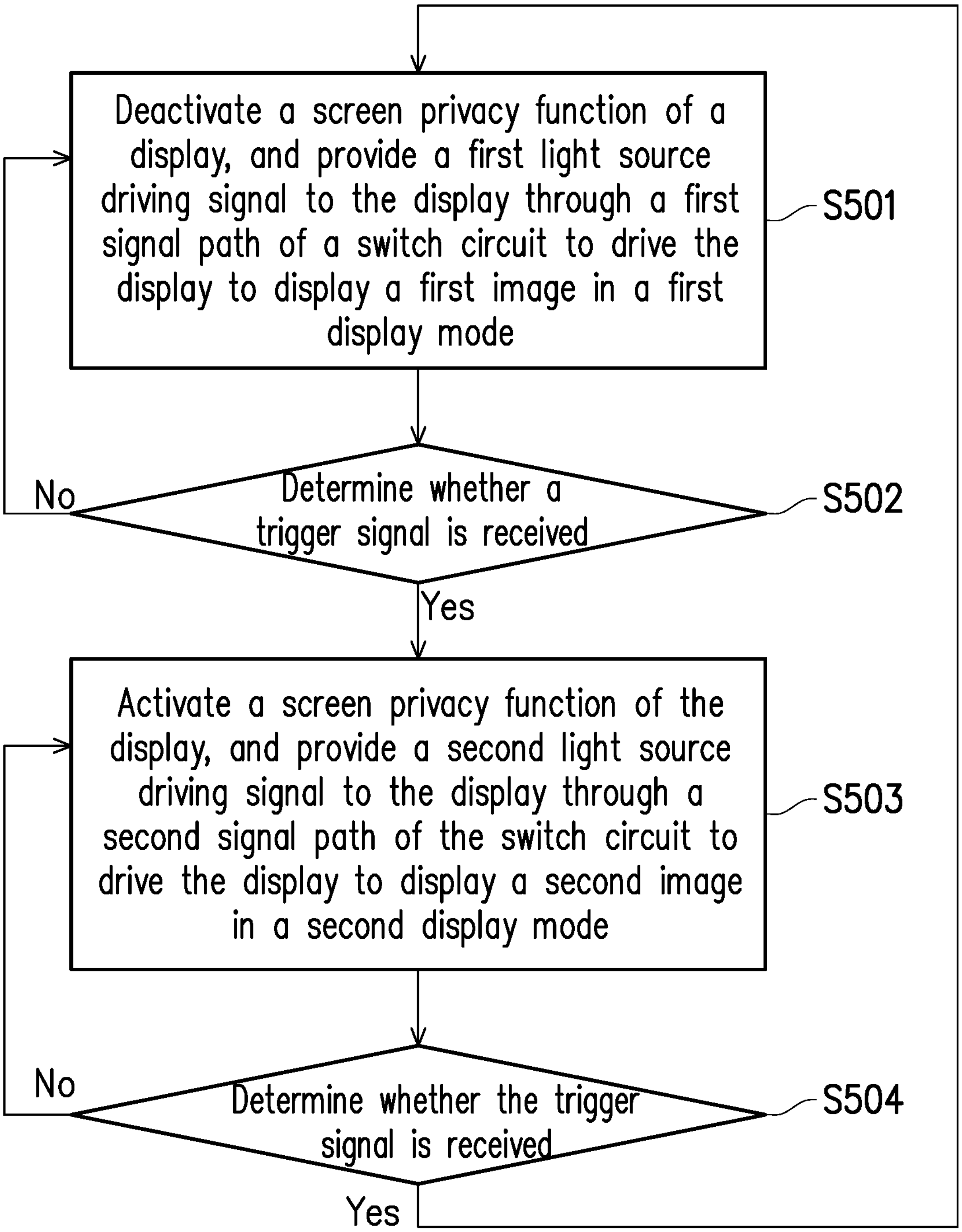
FIG. 5 is a flowchart of a display control method according to an embodiment of the disclosure.

FIG. 5 is a flowchart of a display control method according to an embodiment of the disclosure.

With reference to FIG. 5, in step S501, a screen privacy function of a display is deactivated, and a first light source driving signal is provided to the display through a first signal path of a switch circuit to drive the display to display a first image in a first display mode. In step S502, it is determined whether a trigger signal is received. For example, the trigger signal may be generated by a button module in response to a user operation.

If the trigger signal is received (indicating that the user intends to activate the screen privacy function of the display), in step S503, the screen privacy function of the display is activated, and a second light source driving signal is provided to the display through a second signal path of the switch circuit to drive the display to display a second image in a second display mode. If the trigger signal is not received, after step S502, the flow may return to step S501.

In step S504, it is determined whether the trigger signal is received again. If the trigger signal is received again (indicating that the user intends to deactivate the screen privacy function of the display), after step S504, the flow may return to step S501, in which the screen privacy function of the display is deactivated, and the first light source driving signal is provided to the display through the first signal path of the switch circuit to drive the display to display the first image in the first display mode. If the trigger signal is not received again, after step S504, the flow may return to step S503.

Each step in FIG. 4 and FIG. 5 has been described in detail as above, and will therefore not be repeatedly described here. It is worth noting that each step in FIG. 4 and FIG. 5 may be implemented as multiple codes or circuits, which is not limited by the disclosure. In addition, the methods of FIG. 4 and FIG. 5 may be used with the exemplary embodiments above, and may also be used alone, which is not limited by the disclosure.

In summary of the foregoing, compared to the conventional display whose screen brightness is uniformly controlled by a single signal path or a single control circuit (e.g., a central processing unit), in the disclosure, by making a control circuit (e.g., an embedded controller) that directly communicates with the physical button responsible for activating the screen privacy function and providing the light source driving signal after activating the screen privacy function, the activation efficiency of the screen privacy mode and the light source adjustment efficiency of the display can be effectively improved. In addition, by dynamically reducing the screen brightness of the display and dynamically reducing the viewing angle of the display screen of the display, the performance of screen privacy protection can also be effectively improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display system supporting a privacy function, the system comprising:

a display;

a switch circuit coupled to the display;

a first control circuit coupled to the switch circuit;

a second control circuit coupled to the switch circuit and the display; and a button module coupled to the second control circuit, wherein the first control circuit is configured to provide a first light source driving signal to the display through a first signal path of the switch circuit in a first display mode, the first light source driving signal is configured to control a screen brightness of the display only in the first display mode, the button module is configured to generate a trigger signal in response to a user operation, the trigger signal is configured to change a display mode of the display from the first display mode to a second display mode, and the second control circuit is configured to provide, in response to the trigger signal, a second light source driving signal to the display through a second signal path of the switch circuit and an enabling signal to the display through a third signal path in the second display mode, the second light source driving signal is configured to control the screen brightness of the display only in the second display mode, and the display is configured to activate a screen privacy function and reduce a viewing angle of a display screen of the display in response to the enabling signal in the second display mode, wherein the first signal path, the second signal path, and the third signal path are different from each other, and the screen brightness of the display in the second display mode is lower than the screen brightness of the display in the first display mode.

2. The display system according to claim 1, wherein the second control circuit is further configured to generate a path selection signal in response to the trigger signal, and the switch circuit switches a signal transmission path from the first signal path to the second signal path in response to the path selection signal.

3. The display system according to claim 1, wherein the display reduces the viewing angle of the display screen in response to the screen privacy function being activated.

4. The display system according to claim 1, wherein the user operation triggers a physical button of the button module.

5. The display system according to claim 1, wherein the screen privacy function of the display is in a deactivated state in the first display mode, and the screen privacy function of the display is in an activated state in the second display mode.

6. The display system according to claim 1, wherein a permission for controlling the screen brightness of the display in the first display mode is assigned to the first control circuit, and a permission for controlling the screen brightness of the display in the second display mode is assigned to the second control circuit.

7. The display system according to claim 1, wherein the second control circuit is further configured to switch a permission for controlling a screen brightness of the display from the first control circuit to the second control circuit in response to the trigger signal.

8. A display control method comprising:

providing a first light source driving signal to a display through a first signal path of a switch circuit in a first display mode, wherein the first light source driving signal is configured to control a screen brightness of the display only in the first display mode;

generating a trigger signal in response to a user operation, wherein the trigger signal is configured to change a display mode of the display from the first display mode to a second display mode;

providing, in response to the trigger signal, a second light source driving signal to the display through a second signal path of the switch circuit and an enabling signal to the display through a third signal path in the second display mode, wherein the second light source driving signal is configured to control the screen brightness of the display only in the second display mode; and activating a screen privacy function and reducing a viewing angle of a display screen of the display, by the display, in response to the enabling signal in the second display mode, wherein the first signal path, the second signal path, and the third signal path are different from each other, and the screen brightness of the display in the second display mode is lower than the screen brightness of the display in the first display mode.

9. The display control method according to claim 8, further comprising:

generating a path selection signal in response to the trigger signal; and switching a signal transmission path from the first signal path to the second signal path by the switch circuit in response to the path selection signal.

10. The display control method according to claim 8, further comprising:

reducing the viewing angle of the display screen by the display in response to the screen privacy function being activated.

11. The display control method according to claim 8, wherein the user operation triggers a physical button of a button module.

12. The display control method according to claim 8, further comprising:

deactivating the screen privacy function of the display in the first display mode; and activating the screen privacy function of the display in the second display mode.

13. The display control method according to claim 8, further comprising:

assigning a permission for controlling the screen brightness of the display in the first display mode to the first control circuit; and assigning a permission for controlling the screen brightness of the display in the second display mode to the second control circuit.

14. The display control method according to claim 8, further comprising:

switching a permission for controlling a screen brightness of the display from the first control circuit to the second control circuit in response to the trigger signal.

* * * * *